United States Patent
Viti et al.

(10) Patent No.: US 6,249,101 B1
(45) Date of Patent: Jun. 19, 2001

(54) START-UP PROCEDURE FOR BRUSHLESS DC MOTORS HAVING POSITION SENSORS WITH ANGULAR RESOLUTION LOWER THAN THE RESOLUTION OF THE DRIVING SYSTEM

(75) Inventors: Marco Viti, Cornaredo; Michele Boscolo, Sottomarina, both of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/490,960

(22) Filed: Jan. 24, 2000

(30) Foreign Application Priority Data

Feb. 4, 1999 (EP) ................................. 99830062

(51) Int. Cl.⁷ ................................. G05B 11/01
(52) U.S. Cl. .................. 318/560; 318/254; 318/138; 318/439
(58) Field of Search .................. 318/254, 138, 318/439, 560

(56) References Cited

U.S. PATENT DOCUMENTS

| 4,633,281 | * | 12/1986 | Benjamin et al. | 318/254 |
| 5,231,338 | * | 7/1993 | Bulgarelli et al. | 318/254 |

FOREIGN PATENT DOCUMENTS

| 0 189 675 A1 | 12/1985 | (EP) . |
| 0 741 449 A1 | 4/1996 | (EP) . |
| 08 199571 | 7/1996 | (JP) . |

* cited by examiner

Primary Examiner—Karen Masih
(74) Attorney, Agent, or Firm—Theodore E. Galanthay; Allen, Dyer, Doppelt, Milbrath & Gilchrist, P.A.

(57) ABSTRACT

A start-up routine is provided for a multiphase brushless DC motor having one or more rotor position sensors insufficient to provide for an angular resolution as high as the angular resolution of the synchronized driving system of the motor. The start-up routine includes setting at least an angular check zone having a certain arc length angularly correlated to the one or more rotor position sensors, assuming a certain initial rest position of the rotor, and exciting for fixed time intervals the phase windings in a sequence for rotating the rotor toward an angular position next to the initial position. This routing is performed in the desired direction while masking the signals from the one or more rotor position sensors for a preestablished masking time. The step of exciting for fixed time intervals is repeated until verifying that the excited phases are those commanding advancement of the rotor toward the angular check zone, or a change of state of the signals of the one or more rotor position sensors if the masking time has elapsed. The start-up routine further includes associating to each code of the position sensors a new angular check zone to be reached by repeating the sequence of operations starting from step of exciting.

28 Claims, 5 Drawing Sheets

(clockwise start-up)

(counterclockwise start-up)

START-UP PROCEDURE FOR BRUSHLESS DC MOTORS HAVING POSITION SENSORS WITH ANGULAR RESOLUTION LOWER THAN THE RESOLUTION OF THE DRIVING SYSTEM

FIELD OF THE INVENTION

The present invention relates to multiphase brushless DC motors (typically triphase) that utilize position sensors, such as Hall effect sensors or special circuits, which detect electromagnetic parameters of the phase windings for providing angular resolution thereof. More particularly, the invention relates to a start-up procedure for motors having one or more position sensors with an angular resolution lower than the angular resolution of the driving system that assumes control and drives the motor once the start-up procedure has terminated.

BACKGROUND OF THE INVENTION

A brushless motor includes a permanent magnet rotor and a stator made up of a certain number of windings, typically three, usually connected in a star configuration. However, the number of windings may also be connected independently from each other. Both terminals of each phase winding may be available for external connection to permit the driving of each winding in a completely independent manner from the other windings.

Another common configuration that may be used is the so-called delta or polygonal configuration. Referring by way of example to a traditional triphase brushless motor connected in a star or delta configuration, the driving generally occurs using integrated circuits. Output power stages of the integrated circuit that drives the phase windings may be implemented in the form of a full-wave triphase bridge stage made up of six bipolar or MOS power transistors.

FIG. 1 represents a typical driving stage, and the scheme of a triphase DC brushless motor for the two most common configurations. The prevalent driving method for this type of motor is the bipolar method. That is, at any instant two of the windings are fed and the third winding is unpowered. For example, the third winding is unpowered by placing the respective output node of the full-bridge or half-bridge high impedance state.

The windings are switchably driven according to a duty cycle sequence which must be synchronized with the instantaneous position of the rotor, i.e., the position of its magnetic axis. During a bipolar driving mode, the position of the rotor may be easily monitored by monitoring the back electromotive force (BEMF) of the winding that is momentarily unpowered during a certain switching phase, or the rotor position may be more conventionally sensed through physical position sensors, like Hall-effect sensors.

An alternative and advantageous driving method, described in European Patent Application No. 96,830,295.0, which is assigned to the assignee of the present invention, is based on applying a driving signal to all the windings in a continuous mode and with a waveform profile that optimizes motor performances. For instance, the waveform profile are sinusoidal drive signals. With this driving method, it is advantageous to use position sensors without purposely interrupting the driving to monitor the BEMF.

At present, there exist on the market motors with a number of position sensors equal to the number of phases of the motor itself. However, polyphase DC brushless motors with only one sensor to reduce costs should be available in the future. This will reduce costs, but will provide for an angular resolution of the positions of the rotor with a much lower resolution than the angular resolution compatibilities of the driving systems that are presently commonly used. For instance, a single Hall effect sensor may discriminate positions with an angular resolution of 180 degrees. In contrast, a common driving system for polyphase motors is far more precise by having an angular resolution much higher than 180 degrees.

A specific start-up procedure is required for a Brushless DC motor with respect to sensorless motors. A specific start-up procedure is also required in cases where the information obtained from the sensors is insufficient due to an insufficient angular resolution for identifying the right phase to be commanded, and for yielding the maximum torque.

In these cases, a start-up routine must be performed to generate the torque necessary to overcome static friction, and to bring the motor to rotate at a speed sufficient to permit exploitation of monitoring the voltage induced on the windings. This is through which momentarily is not forced any driving current by the rotor (BEMF voltage), or the signal(s) originating from the position sensors to synchronize the phase switching.

SUMMARY OF THE INVENTION

An object of the present invention is to provide a start-up procedure for polyphase motors including position sensors having angular resolution lower than the resolution of the driving system. Position sensors include Hall effect sensors or special circuits for assessing electromagnetic parameters of the phase windings.

By knowing or assuming an initial rotor's position with the motor at a stand still, a sequence of excitations of the phase windings are generated to rotate the rotor in the desired direction. The starting phase of the excitation sequence is chosen in consideration of a known or assumed initial rotor's position, and the sequence of the phase switching advances until reaching a predefined position of the electrical revolution. This may be chosen as a function of the position of the sensor or sensors.

Once the switching sequence has reached the point of exciting the phase corresponding to such a preselected position, the routine may proceed in two alternative ways. First, the switching sequence is halted and a change of state of the digital signal output by position sensor(s) is waited for. When this occurs, the phase switching resumes and progresses to a new preselected position when they are interrupted again. The routine then waits for the occurrence of a change of state of the position sensor(s) signals. These steps are repeated until the start-up is considered complete, such as when the motor exceeds a certain minimum speed, for example. Second, the digital codes originating from the position sensor(s) are used to establish the phases to be successively excited. The present invention applies to any type of multiphase brushless motor.

DETAILED DESCRIPTION OF THE PREFERRED EMBODIMENTS

The start-up routine is described as follows. The following expressions and definitions are adopted to simplify the ensuing description:

"Excite the position" stands for exciting the motor's phases to produce a torque which tends to rotate the rotor, i.e., its magnetic axis, to a certain angular position of the electrical revolution of the motor.

"Excite the successive position" stands for exciting the motor's phases to produce a torque that tends to rotate the rotor, i.e, its magnetic axis, to an angular position immediately successive to its present position in a clockwise or in a counter-clockwise direction. The successive angular position will differ from the previous one by $\alpha$ electrical degrees where $\alpha$ is the angular resolution of the driving system being used. For example, in a triphase brushless DC motor driven in a traditional bipolar mode, i.e., 2 phase windings ON and 1 phase winding OFF, $\alpha$ is equal to 60 electrical degrees.

"AC, BC, BA, CA, CB, AB" are the six angular rotor's positions which may be commanded in a triphase brushless DC motor by exciting two windings while leaving the third winding in a high impedance state. For example, AC is the rotor angular position that is commanded by applying a voltage on the A terminal higher than the voltage applied on the C terminal. Similarly, CA is the rotor angular position of the rotor that is commanded by applying a voltage on the C terminal higher than the voltage applied on the A terminal. These positions may be observed in FIG. 2.

"X zone" relative to phase x is the angular zone which covers an arc of $\alpha$ electrical degrees. The variable x may be AC, BC, BA, CA, CB, AB.

"Check zone" is an arc of $\alpha$ electrical degrees which may be chosen in consideration of the location of the position sensor(s).

The method of the present invention may be illustrated by starting from the assumption that the rotor position is known at the beginning of a start-up routine. In practice, this assumption is easily determinable. With the motor at a stand still, it is possible to detect the rotor's position by any one of several different known techniques. This is generally based on measuring the time constant of the R-L circuit of each motor winding. This parameter is a function of the rotor's position.

Figure 1:
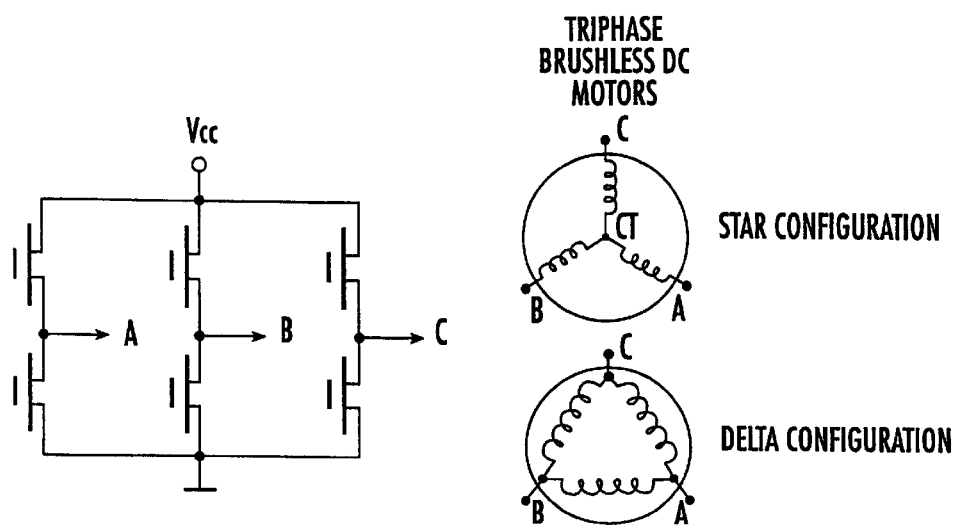
FIG. 1 shows an output triphase bridge stage, and a triphase DC brushless motor in a star and triangle configuration which is connectable thereto, according to the prior art.
Figure 2:
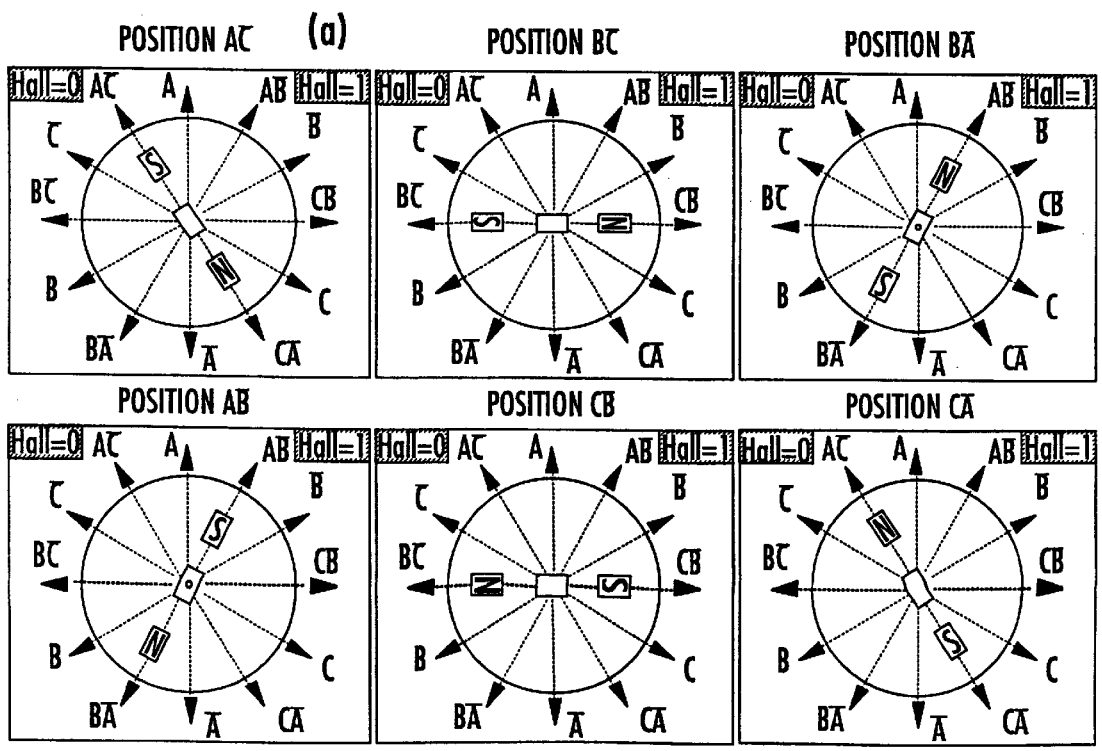
FIG. 2 shows six different electrical positions for a triphase brushless DC motor in a stand-still condition with a resolution of 60 electrical degrees, according to the prior art.

By assuming detection of the rotor's position with a 60 electrical degrees resolution while the motor is still at a stand still, six detectable electrical positions as illustrated in FIG. 2 are possible. These electrical positions are applicable for the case of a triphase brushless DC motor with a single Hall effect position sensor driven in a traditional bipolar mode, i.e., with two phases ON and a phase OFF. These electrical positions are also applicable for the case of a triphase brushless DC motor wherein the rotor may be commanded to move by exciting two phases while leaving the third at a high impedance, i.e., two phases ON and a phase OFF.

The start-up routine involves starting rotor movement by exciting, for pre-established intervals of time, the motor's position that follows the position at which the rotor was found to be at rest. The pre-established intervals of time are to be defined as a function of the motor's characteristics. In this first step of the routine, the rotor is accelerated in the desired direction of rotation.

When the period of time during which the signals originating from the position sensor(s) are discarded elapses, e.g., a masking time $\geq 0$, it is assessed which position is being excited. This is while continuing excitation of the successive positions until a pre-established position is achieved. The position centered with a certain check zone may be chosen to correspond to the location of the sensor(s), or until the occurrence outside the masked zone of a change of state of the position sensor(s). When one or the other of the above noted two conditions is verified, the code provided by the position sensor(s) is used to establish a check zone to be reached by further exciting in sequence the next positions.

Figure 3:
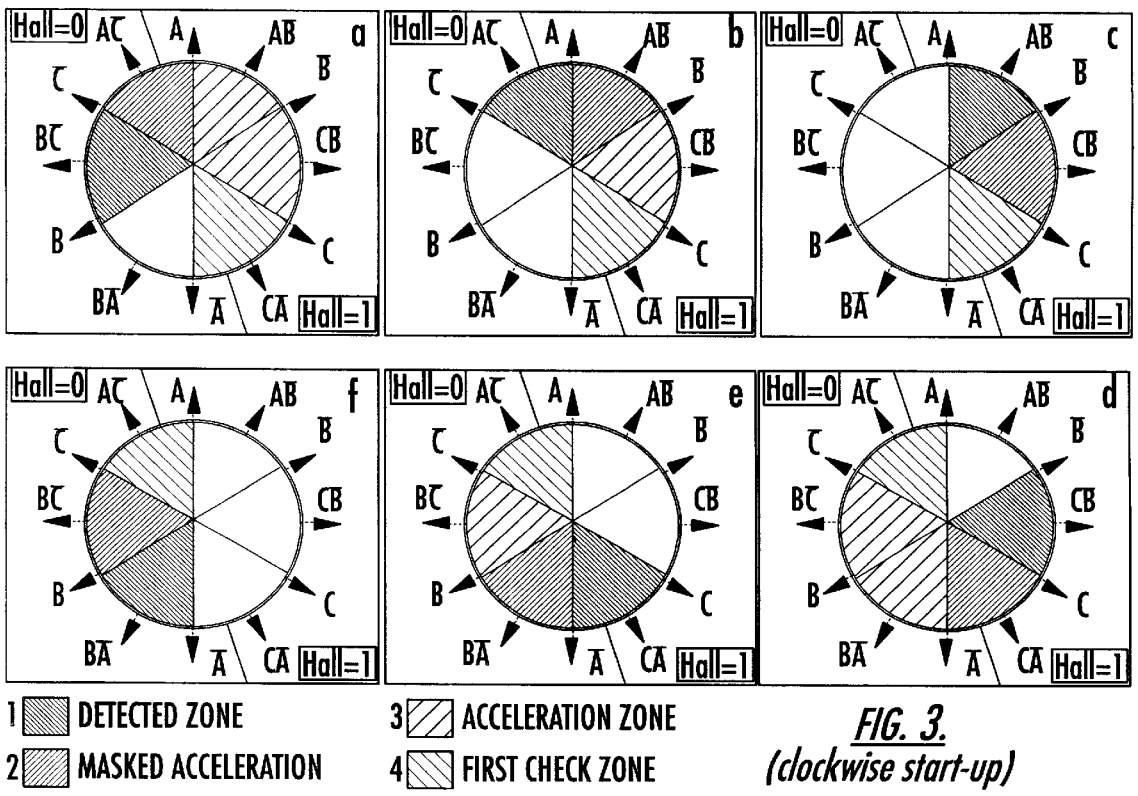
FIG. 3 shows a possible excitation sequence of the motor phases during a first acceleration period for a clockwise rotation, according to the present invention. In the figure, check zones have been chosen to coincide with the zones where the only Hall effect sensor installed changes state.
Figure 4:
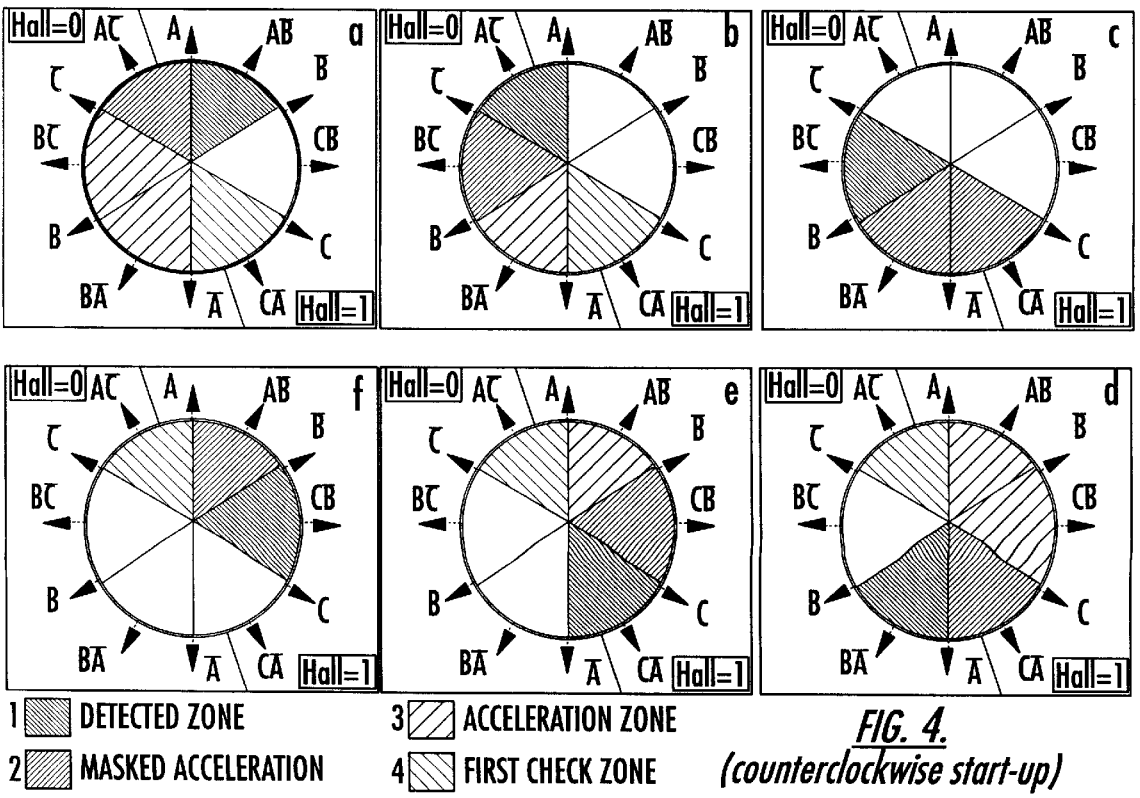
FIG. 4 shows a possible excitation sequence of the motor phases during a first acceleration period for a counter-clockwise rotation, according to the present invention. In the figure, check zones are chosen to coincide with the zones where the only Hall effect sensor installed changes state.

As an example, FIG. 3 shows the case of a triphase brushless DC motor with one Hall-effect position sensor positioned to switch when a magnetic axis of the rotor crosses the CA and AC check zones, i.e., arcs of a circumference. In addition, it has been assumed that the driving system allows for an angular resolution $\alpha$ of 60 electrical degrees and a clock-wise rotation. The six possible excitation positions are AC, AB, CB, CA, BA, BC.

Still referring to FIG. 3, the rotor is initially in the BC position and the masked interval of acceleration corresponds to an excitation period of the AC position. This position follows the initially known or assumed position with the motor at rest. The first check zone corresponds to the CA position zone, whereas another check zone corresponds to the AC position zone which is not shown in the figure.

This example considers check zones as those which when traversed by the magnetic axis cause the signal originating from the sensor to change its value. In the example considered, the start-up routine begins with the excitation of the AC position for a certain time. This certain time is for a time $\geq 0$ during which the signal originating from the position sensor is not read. The start-up routine continues thereon by exciting for a time $\geq 0$ the AB, CB and CA positions.

If during the excitation of the positions AB or CB the signal originating from the position sensor changes, then the sensor's coding is immediately used to establish the new check zone to be reached by exciting the successive positions for intervals of time greater than 0. In the described example, if a variation of the signal coming from the position sensor is detected during the excitation of the positions AB and CB and its new state is 1, then a new check zone is taken that is relative to the CA position. This also applies if the signal variation of the position sensor detected during the excitation of the positions AB or CB is 0. Consequently, the new check zone is taken as the zone relative to the AC position.

If at the end of the excitation time of the AB and CB positions the signal originating from the position sensor does not vary, sensor code is used to establish the new check zone to be reached by exciting successive positions for time intervals ≧0. In this case, if at the end of the excitation period of the CB position, the position sensor switches to 0. The new check zone will be the AC position and if it switches to 1, the new check zone will be the CA position. Therefore, in the latter case the check zone to be reached by way of successively exciting the relative positions to be crossed is determined by the digital code of the position sensor.

Figure 6:
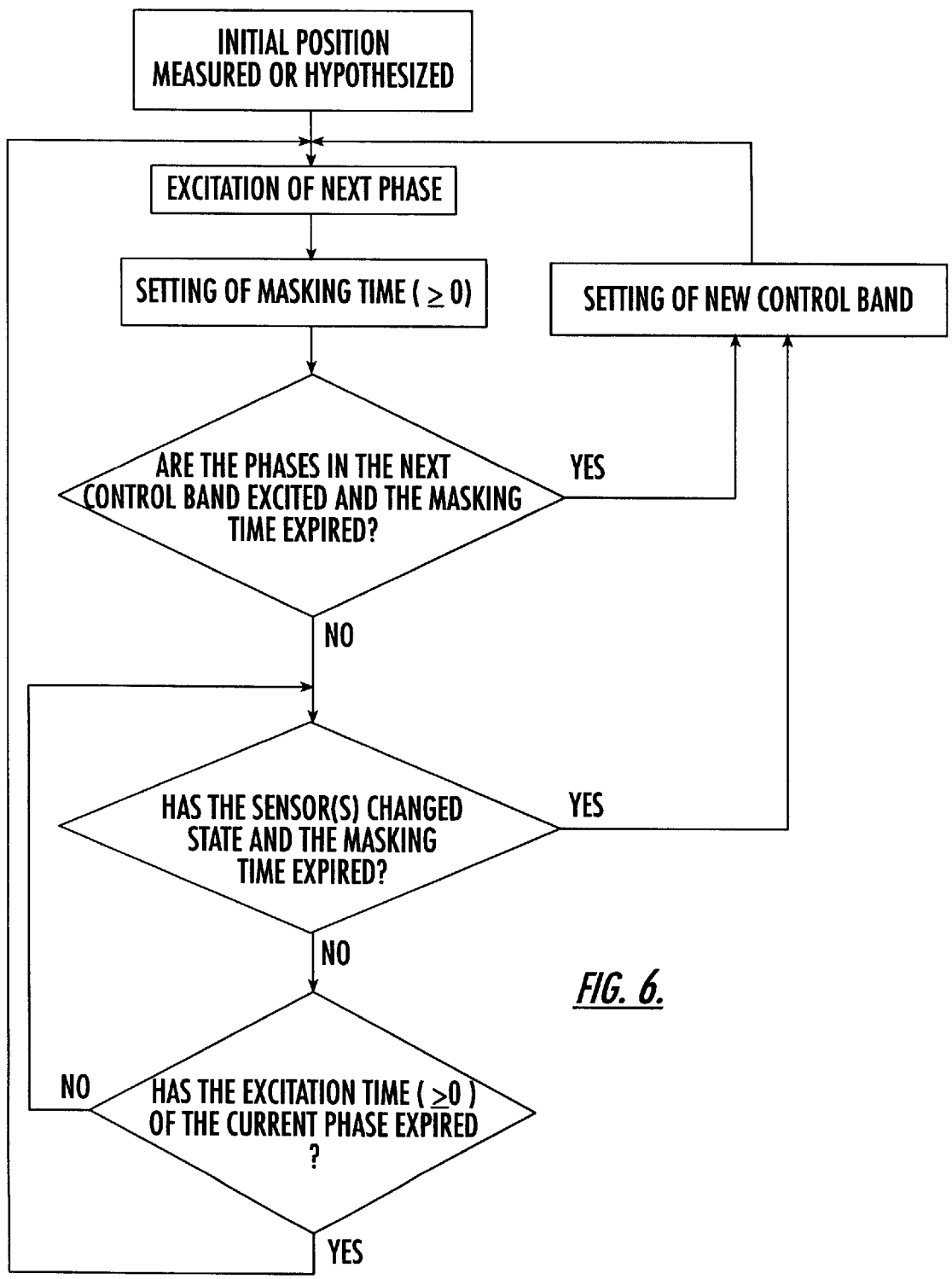
FIGS. 6 and 7 are flow diagrams of alternative embodiments of the start-up routine, according to the present invention.
Figure 7:
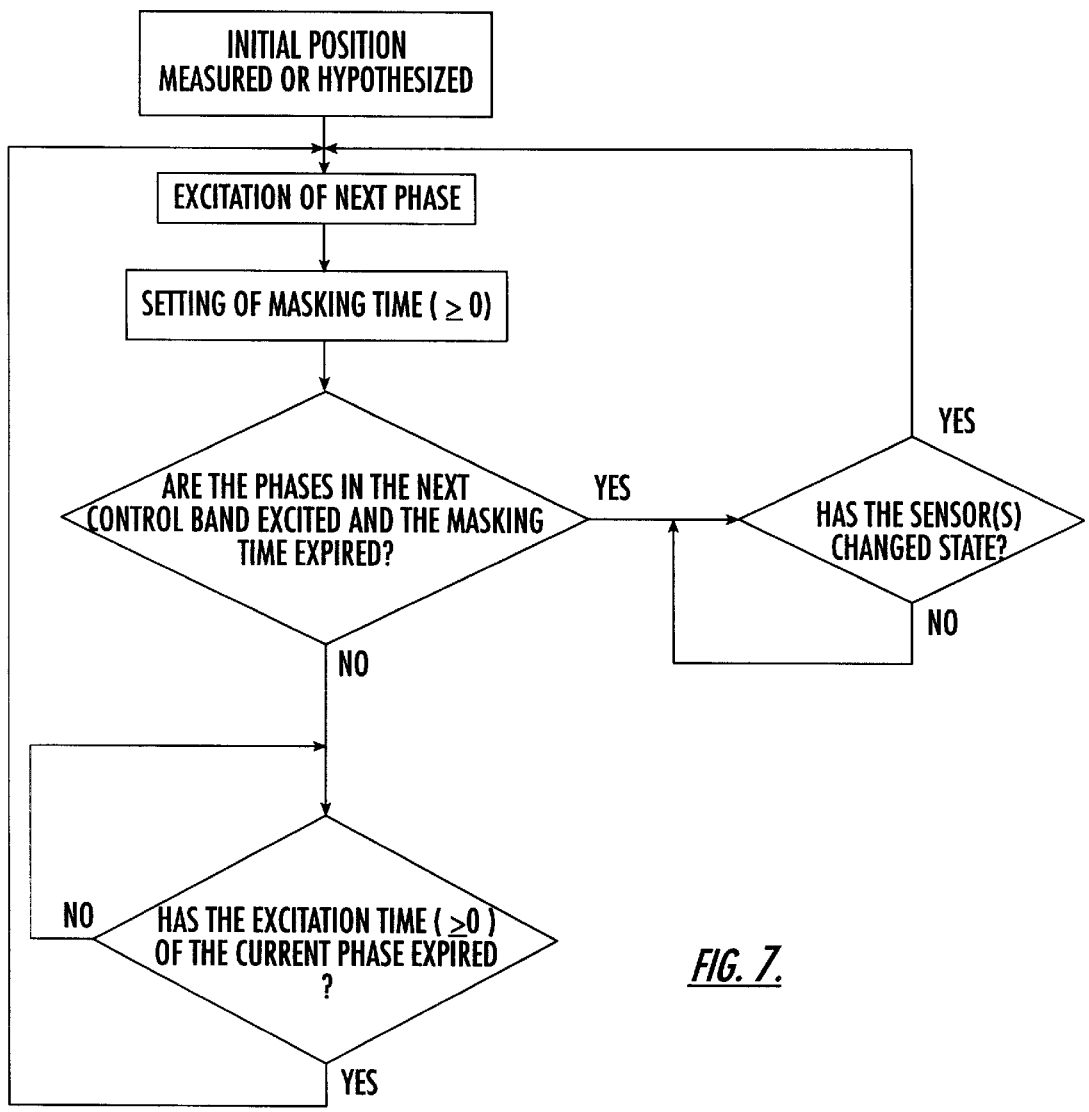

A flow diagram of the embodiment of the invention described above is depicted in FIG. 6. An alternative embodiment of the invention is depicted by the flow diagram of FIG. 7. According to this alternative embodiment, once the set check zone is reached, a change of state of the position sensor is waited for while continuing excitations of the next positions in sequence.

The end of the start-up procedure will now be discussed. The above described algorithms may be interrupted at any movement wherein the start-up of the motor is considered concluded. In practice, this may be done upon reaching a certain speed.

Figure 5:
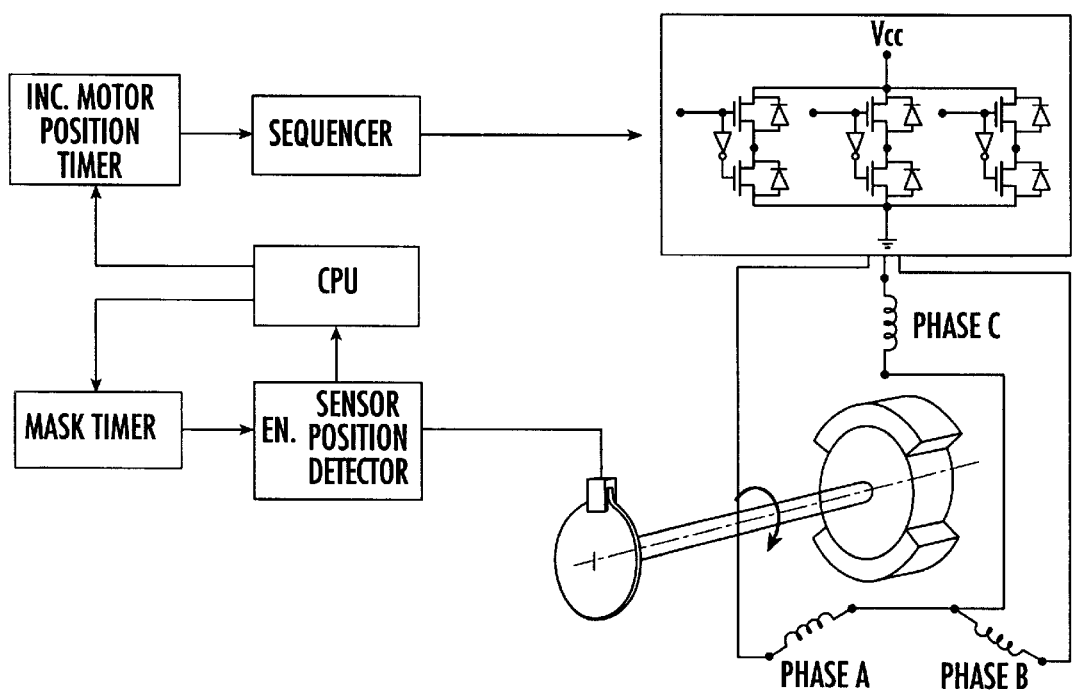
FIG. 5 shows a block diagram of a system implementing the start-up routine for a triphase brushless motor in a star configuration, according to the present invention.

FIG. 5 shows a scheme of a start-up system implementing the routine of the invention for a triphase brushless DC motor equipped with only one position sensor. The system uses a CPU which sets the masked acceleration time and the excitation time of the different positions following in sequence the position read or at rest. The position sensor is enabled after a preestablished time (masked acceleration) that is set by the mask timer. The sequencer increments the motor positions at intervals determined by the value set through the increase motor position timer.

That which is claimed is:

1. A start-up routine for a multiphase brushless DC motor having at least one rotor position sensor for providing an angular resolution less than an angular resolution of a synchronized driving system of the motor, the start-up routine comprising:

setting at least one angular check zone having an arc length angularly correlated to a position of the at least one rotor position sensor;

assessing or presuming an initial rest position of a rotor of the motor;

exciting for fixed time intervals phase windings of the rotor in a sequence for rotating the rotor in a desired direction toward an angular position next to the initial rest position of the rotor while masking signals from the at least one rotor position sensor for a predefined masking time;

repeating the exciting until verifying that excited phase windings are those commanding advancement of the rotor toward the at least one angular check zone, or verifying a change of state of the signal from the at least one rotor position sensor if the predefined masking time has elapsed; and associating to each signal of the at least one rotor position sensor a new angular check zone to be reached by repeating the sequence of operations starting from the exciting.

2. A start-up routine according to claim 1, wherein the exciting is completed when the motor exceeds a minimum speed.

3. A start-up routine according to claim 1, wherein the assessing or presuming an initial rest position of the rotor is based upon measuring a time constant of an R-L circuit of each phase winding.

4. A start-up routine according to claim 1, wherein an angular resolution of the at least one rotor position sensor is about 180 degrees.

5. A start-up routine according to claim 1, wherein the angular resolution of the synchronized driving system of the motor is about 60 degrees.

6. A start-up routine according to claim 1, wherein the at least one rotor position sensor comprises a Hall sensor.

7. A start-up routine for a multiphase brushless DC motor having at least one rotor position sensor for providing an angular resolution less than the angular resolution of the synchronized driving system of the motor, the start-up routine comprising:

setting at least one angular check zone having an arc length angularly correlated to a position of the at least one rotor position sensor;

assessing or presuming an initial rest position of a rotor of the motor;

exciting for fixed time intervals phase windings of the rotor in a sequence for rotating the rotor in a desired direction toward an angular position next to the initial rest position of the rotor while masking signals from the at least one rotor position sensor for a predefined masking time;

repeating the exciting until verifying that excited phase windings are those commanding advancement of the rotor toward the at least one angular check zone, or verifying a change of state of the signal from the at least one rotor position sensor if the predefined masking time has elapsed;

stopping the sequence of exciting the phase windings of the rotor until the signal from the at least one rotor position sensor changes state; and repeating the sequence of operations starting from the exciting.

8. A start-up routine according to claim 7, wherein the exciting is completed when the motor exceeds a minimum speed.

9. A start-up routine according to claim 7, wherein the assessing or presuming an initial rest position of the rotor is based upon measuring a time constant of an R-L circuit of each phase winding.

10. A start-up routine according to claim 7, wherein an angular resolution of the at least one rotor position sensor is about 180 degrees.

11. A start-up routine according to claim 7, wherein the angular resolution of the synchronized driving system of the motor is about 60 degrees.

12. A start-up routine according to claim 7, wherein the at least one rotor position sensor comprises a Hall sensor.

13. A start-up system for a multiphase brushless DC motor comprising:

at least one rotor position sensor;

a processor connected to said at least one rotor position sensor for implementing a start-up routine comprising setting at least one angular check zone having an arc length angularly correlated to a position of the at least one rotor position sensor, assessing or presuming an initial rest position of a rotor of the motor, exciting for fixed time intervals phase windings of the rotor in a sequence for rotating the rotor in a desired direction toward an angular position next to the initial rest position of the rotor while masking signals from the at least one rotor position sensor for a predefined masking time, repeating the exciting until verifying that excited phase windings are those commanding advancement of the rotor toward the at least one angular check zone, or verifying a change of state of the signal from the at least one rotor position sensor if the predefined masking time has elapsed, and associating to each signal of the at least one rotor position sensor a new angular check zone to be reached by repeating the sequence of operations starting from the exciting.

14. A start-up system according to claim 13 further comprising a mask timer connected to said processor and to said at least one rotor position sensor for providing the predefined masking time.

15. A start-up system according to claim 13 further comprising:

a motor position timer connected to said processor; and a sequencer connected to said motor position timer and to the motor for incrementing motor positions at intervals determined by a value set by said motor position timer.

16. A start-up system according to claim 13 stops exciting the phase windings of the motor when the motor exceeds a minimum speed.

17. A start-up system according to claim 13, wherein the assessing or presuming an initial rest position of the rotor is based upon measuring a time constant of an R-L circuit of each phase winding.

18. A start-up system according to claim 13, wherein an angular resolution of the at least one rotor position sensor is about 180 degrees.

19. A start-up system according to claim 13, further comprising a synchronized driving system of the motor having an angular resolution of about 60 degrees.

20. A start-up system according to claim 13, wherein the at least one rotor position sensor comprises a Hall sensor.

21. A start-up system for a multiphase brushless DC motor comprising:

at least one rotor position sensor;

a processor connected to said at least one rotor position sensor for implementing a start-up routine comprising setting at least one angular check zone having an arc length angularly correlated to a position of the at least one rotor position sensor;

assessing or presuming an initial rest position of a rotor of the motor, exciting for fixed time intervals phase windings of the rotor in a sequence for rotating the rotor in a desired direction toward an angular position next to the initial rest position of the rotor while masking signals from the at least one rotor position sensor for a predefined masking time, repeating the exciting until verifying that excited phase windings are those commanding advancement of the rotor toward the at least one angular check zone, or verifying a change of state of the signal from the at least one rotor position sensor if the predefined masking time has elapsed, stopping the sequence of exciting the phase windings of the rotor until the signal from the at least one rotor position sensor changes state, and repeating the sequence of operations starting from the exciting.

22. A start-up system according to claim 19 further comprising a mask timer connected to said processor and to said at least one rotor position sensor for providing the predefined masking time.

23. A start-up system according to claim 19 further comprising:

a motor position timer connected to said processor; and a sequencer connected to said motor position timer and to the motor for incrementing motor positions at intervals determined by a value set by said motor position timer.

24. A start-up system according to claim 19 stops exciting the phase windings of the motor when the motor exceeds a minimum speed.

25. A start-up system according to claim 19, wherein the assessing or presuming an initial rest position of the rotor is based upon measuring a time constant of an R-L circuit of each phase winding.

26. A start-up system according to claim 19, wherein an angular resolution of the at least one rotor position sensor is about 180 degrees.

27. A start-up system according to claim 19, further comprising a synchronized driving system of the motor having an angular resolution of about 60 degrees.

28. A start-up system according to claim 19, wherein the at least one rotor position sensor comprises a Hall sensor.

* * * * *